United States Patent [19]

Mochida

[11] 4,334,438
[45] Jun. 15, 1982

[54] CLEARANCE ADJUSTING MECHANISM

[75] Inventor: Haruo Mochida, Yokohama, Japan

[73] Assignee: Nissan Motor Company, Limited, Japan

[21] Appl. No.: 125,458

[22] Filed: Feb. 28, 1980

[30] Foreign Application Priority Data

Mar. 9, 1979 [JP] Japan .................................. 54-27344
Apr. 25, 1979 [JP] Japan .................................. 54-51638

[51] Int. Cl.³ ............................................. F16C 1/22
[52] U.S. Cl. ........................... 74/501 R; 74/501.5 R; 411/252; 411/438
[58] Field of Search ......................... 74/501 R, 501.5; 151/14 CS, 69; 85/32 CS; 411/438, 251, 252

[56] References Cited

U.S. PATENT DOCUMENTS

| | | | |
|---|---|---|---|
| 2,082,956 | 6/1937 | Hall | 151/14 CS |
| 2,886,088 | 5/1959 | Brancato | 85/32 CS |
| 3,063,303 | 11/1962 | Cadwallader | 74/501 |
| 3,177,782 | 4/1965 | Sampson | 85/32 CS |
| 3,795,295 | 3/1974 | Reno | 192/110 R |
| 3,957,380 | 5/1976 | Degrazia | 403/14 |
| 4,185,516 | 1/1980 | Betlinski | 74/501.5 R |

FOREIGN PATENT DOCUMENTS

| | | |
|---|---|---|
| 2360058 | 12/1972 | Fed. Rep. of Germany .... 74/501 R |
| 7626479 | 12/1976 | Fed. Rep. of Germany . |
| 1444359 | 5/1966 | France . |
| 309425 | 4/1929 | United Kingdom . |
| 619709 | 3/1949 | United Kingdom . |
| 628282 | 8/1949 | United Kingdom . |
| 1112271 | 5/1968 | United Kingdom . |
| 1200795 | 8/1970 | United Kingdom . |
| 1489192 | 10/1977 | United Kingdom . |

Primary Examiner—Kenneth Dorner
Attorney, Agent, or Firm—Lane, Aitken, Kice & Kananen

[57] ABSTRACT

A clearance adjusting mechanism comprises a first member having an external thread, a second member having an internal thread screwed with said external thread of said first member, and a locking coil for locking the relative movement between said first and second members only in case of a predetermined rotation direction thereof.

9 Claims, 9 Drawing Figures

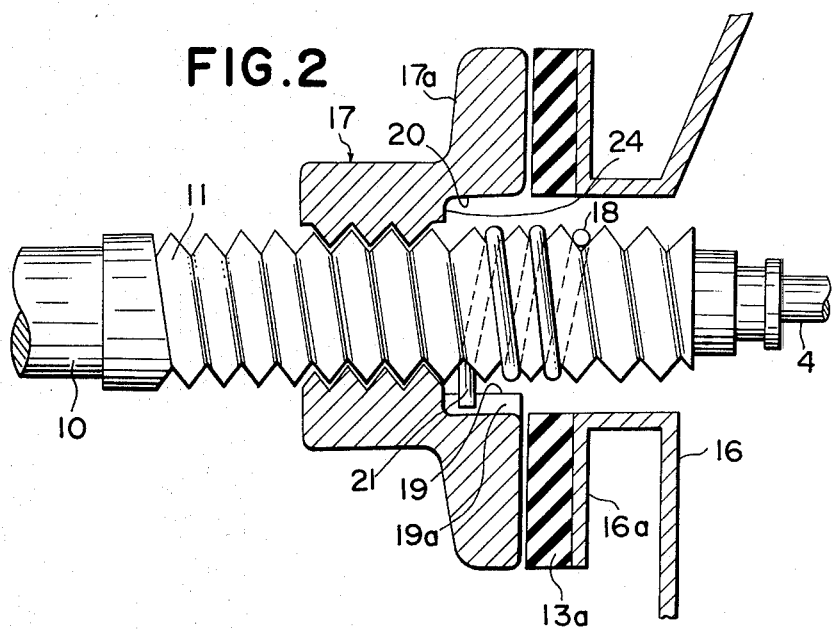
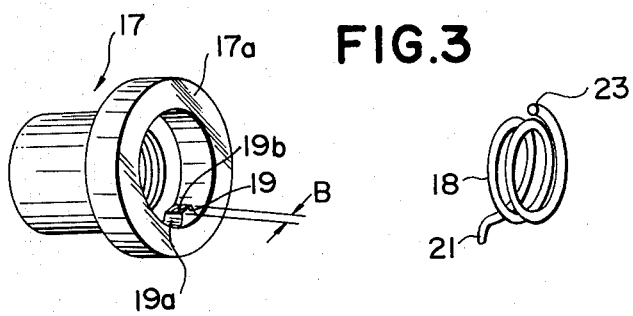
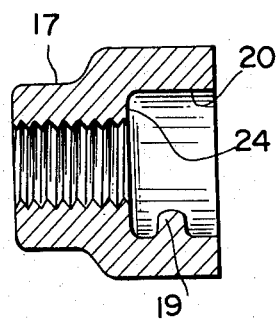
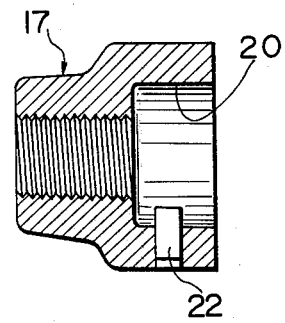

CLEARANCE ADJUSTING MECHANISM

BACKGROUND OF THE INVENTION

This invention relates to a clearance adjuster with which a predetermined amount of clearance between a certain member and another member can be secured with accuracy and ease. For instance, such a clearance adjuster is useful with the control cable of normally non-contacting type clutch system for motor vehicles.

A conventional normally non-contacting type of cable control system will be explained referring to FIG. 1. A cable guide 13 having a through hole 13b is fixed on the body of the vehicle 16. The outer cable 10 is fixed on the clutch housing 1 at its one end, with the other end forming a screw 11, which is attached with double nut 12, said screw 11 piercing through the cable guide 13. The inner cable 4 is connected to the clutch pedal 14 at its one end, with the other end connected to the withdrawal lever 2.

The clutch system as above-described operates in such a manner that, when the clutch pedal 14 is kicked down, the inner cable 4 is displaced relative to the outer cable 10 thereby to rotate the withdrawal lever 2 counter-clockwise in the drawing, around the point 2a. Whereupon the release bearing 3 presses the central portion of the diaphragm spring 5, to release the pressure of facing 6 exerted on the flywheel 9. In assembling this type of clutch system, care must be taken to secure a predetermined amount of clearance A between the withdrawal lever 2 and the release bearing 3, so that the pressure of the facing 6 on the flywheel 9 should be released at the optimum position. Also, since the amount of rotation of the withdrawal lever 2 corresponding to the set degree of movement of clutch pedal 14 tends to vary due to the stretching of inner cable 4 and wear of facing 6 during their use over a prolonged period, the clearance must be adjusted time to time to always secure the proper actions of concerned parts.

For this purpose, in the conventional adjuster the double nut 12 as shown in FIG. 1 or an E-ring (not shown) is used to effect the adjustment.

That is, while the withdrawal lever 2 is kept as pressed against the release bearing 3, the double nut 12 (or E-ring) is adjusted to secure a predetermined clearance A' between the same and the cable guide 13. In that operation, the fixed position of the double nut is determined either by using a gauge of a predetermined thickness or by eye measurement. In the former case the assembling requires much labor, and in the latter case the clearances are not uniform and inaccurate. The assembling becomes relatively easier when an E-ring is used to secure the predetermined clearance. However, because the E-ring grooves are provided stepwise on one end of the outer cable 10, fine and optimum clearance adjustment is impossible. In a worst case a dislocation by one pitch of the E-ring grooves occurs.

SUMMARY OF THE INVENTION

An object of the present invention is to provide a clearance adjusting mechanism wherein the clearance can be adjusted with ease and accuracy.

A further object of the present invention is to eliminate the deficiency of the prior art mechanism.

According to the present invention, a clearance adjusting mechanism comprises a first member, a second member and a locking member. The first member has an external thread. The second member includes an internal thread screwed with the external thread of the first member. The locking oil is adapted to lock the relative movement between the first and second member only in case of a predetermined rotation direction thereof.

BRIEF DESCRIPTION OF THE DRAWINGS

These and other objects, features and advantages of the present invention will become more apparent from the following description of the preferred embodiments thereof taken in conjunction with the accompanying drawings in which;

FIG. 2 is a sectional view showing a clearance adjusting mechanism according to an embodiment of the present invention;

FIG. 3 is a perspective view showing a nut and locking coil of the clearance adjusting mechanism as shown in FIG. 2;

FIG. 4 shows another embodiment of the nut to be used in the adjuster of this invention;

FIG. 5 shows still another embodiment of the nut in the adjusting mechanism of this invention;

DETAILED DESCRIPTION OF THE PREFERRED EMBODIMENTS

Figure 1:
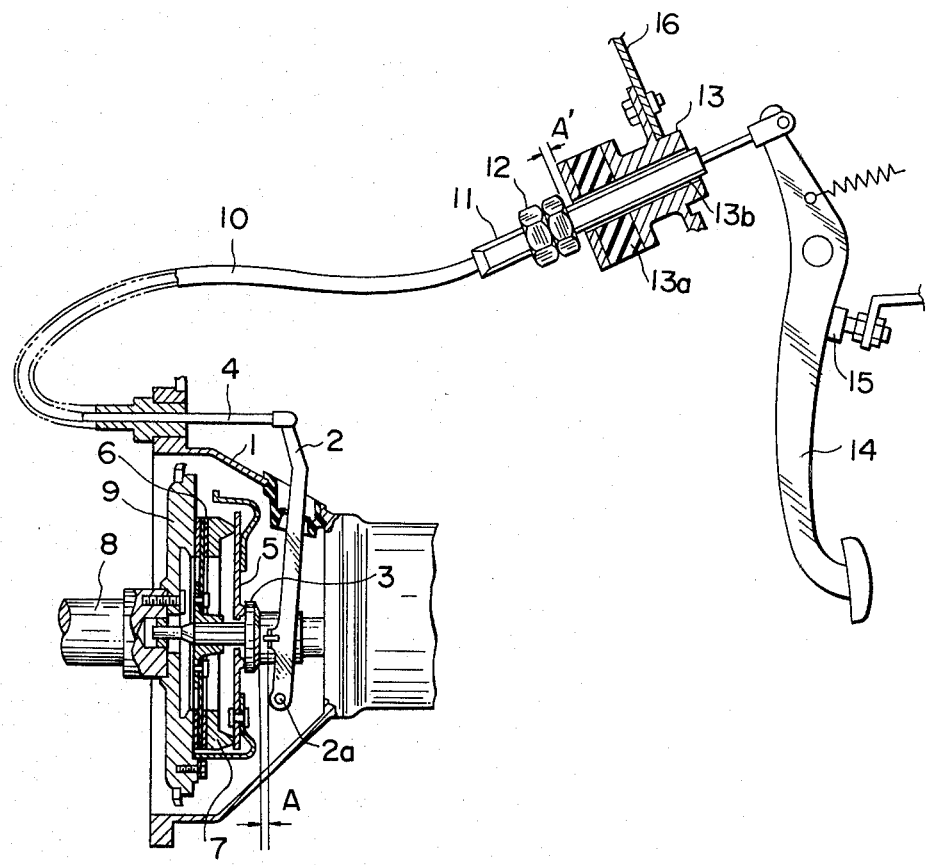
FIG. 1 is a schematic sectional view showing a conventional normally non-contacting type of cable control mechanism for a clutch system.

Referring to FIGS. 2 through 4, the external thread 11 formed on one end of the outer cable 10 is screwed with a nut 17 and locking coil 18. The locking coil 18 has a bent portion 21 on its one end and an extension 23 on the other end, and of which coiling diameter and wire size are so determined that, when it is coiled at the same pitch with that of the external thread 11, it should exhibit a predetermined level of binding or clamping power on the external thread 11. The nut 17 has a flange 17a formed on its forward end, and on a part of its seating portion 20 a projection 19 of a predetermined height is provided. The projection 19 engages with the bent portion 21 of the locking coil 18, in such a relationship that, when the nut 17 is moved leftward in FIG. 2, the face 19a of the projection 19 bears against the bent portion 21 of the locking coil 18 to clamp the latter. If the nut 17 is moved in the reverse direction, the opposite side face 19b of the projection 19 bears against the bent portion 21 of the locking coil 18 to slacken the latter.

One end of the outer cable 10 is fixed on the clutch housing 1, and the other end passes through the body of the vehicle 16. As shown in FIG. 1, the inner cable 4 is connected to the clutch pedal 14 at one end, with the other end connected to the withdrawal lever 2.

In operation, while keeping the withdrawal lever 2 as pressed against the release bearing 3, the nut 17 is rotated until the flange 17a comes into contact with an elastic member 13a, for example, made of vibration-proof rubber, the elastic member 13a being fixed on the flange portion 16a of the vehicle body 16. Also, the bent portion 21 of the locking coil 18 meets against the face 19b of the projection 19 on the nut 17 to enlarge the coiling diameter of the locking coil 18, which therefore loses its clamping power and rotates with the nut 17. If rotation of the nut 17 is further continued, the bent portion 21 meets against the other face 19a of the projection 19, to reduce the diameter of coil 18 to restore the coil's clamping power and make the nut 17 unrotatable. Whereupon a predetermined clearance is automatically obtained between the nut 17 and the elastic member 13a.

In the above operation, the clearance is determined by the screw pitch and the rotation angle of the nut 17, that is, by the configuration and the width B (FIG. 3) of the projection 19. Thus, when the screw pitch is selected appropriately and the width B of the projection 19 shown in FIG. 3 is made extremely small, the nut can have a reversal by approximately one turn, i.e., the clearance corresponding to approximately one pitch can be set. The clearance can be freely reduced from the above, by increasing the width B and decreasing the reversible angle within the one turn. As shown in FIG. 4, the reversal may be stopped at an optional point exceeding one turn, by locating the projection 19 at an optional position of the seating area 20 of the nut 17.

The projection 19 may be formed of a pin 22 fitted in the hole 17b of the nut 17 as shown in FIG. 5.

Figure 6A:
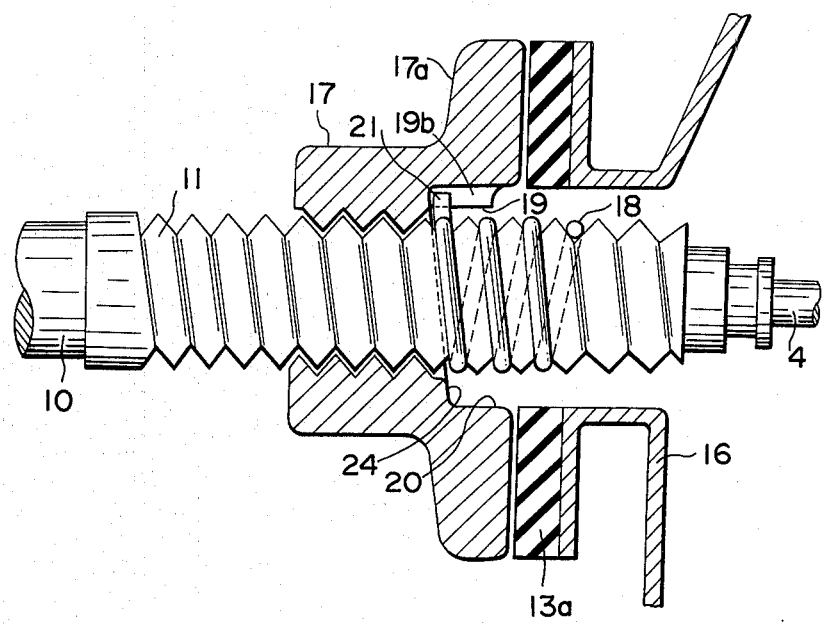
FIG. 6 shows another embodiment of the adjuster and nut of this invention.
Figure 6B:
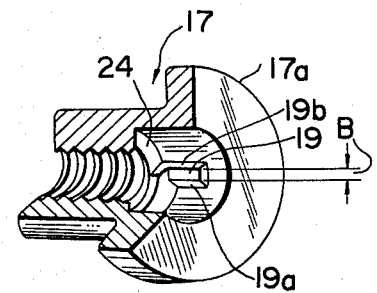

FIGS. 6A and 6B show a further embodiment of the invention. Although a desired clearance can be obtained with ease using the above-described mechanism, there remains a possibility that, when the bottom plane 24 of the nut is flat as shown in FIG. 2, the predetermined clearance may not be secured because the bent portion of the locking coil may contact the bottom plane 24 of the nut 17 before contacting the projection 19, when the nut 17 is positively rotated. Otherwise, the locking coil might be deformed and come out of the external thread 11, making the positive rotation of nut impossible. Therefore, it is preferable that the bottom plane 24 of the nut is inclined along the angle of the thread, matching the lead angle of the screw, as shown in FIGS. 6A and 6B. Whereupon the space between the bottom plane 24 and the bent portion 21 of the locking coil 18 is kept constant, and the possibilities as above-described can be eliminated.

Incidentally, when reversal of nut 17 is required during the adjustment, an input is given to the right end of the locking coil 18. Whereupon the diameter of the coil 18 is enlarged to release the screw portion, allowing the reversal of nut 17.

Figure 7:
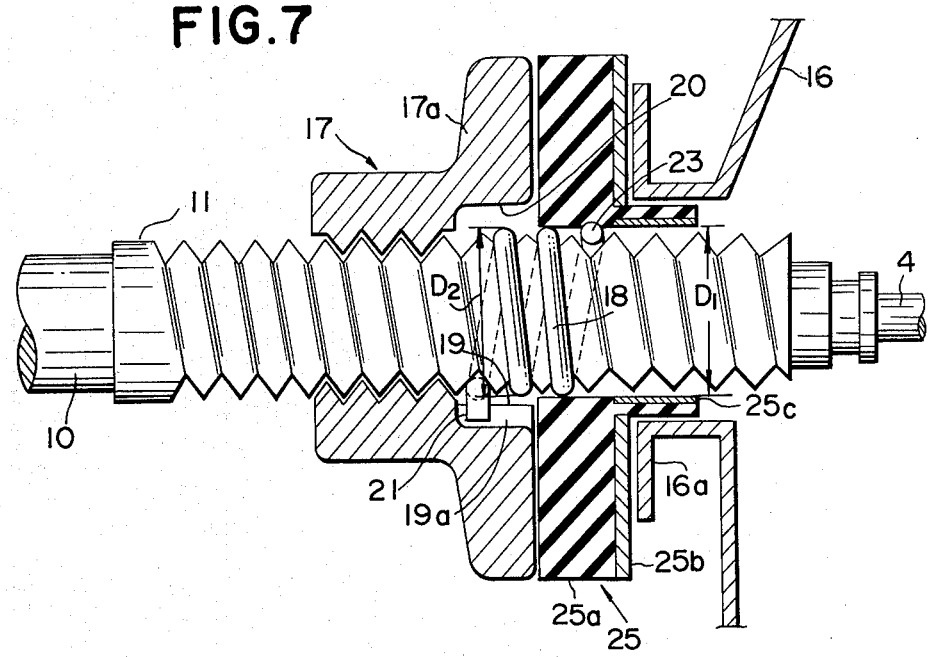
FIGS. 7 and 8 show other embodiment of the adjuster of this invention.

Another embodiment of this invention will be explained with reference to FIG. 7. The elastic member 13a shown in FIG. 2 is replaced by a ring 25 which is not fixed on the flange portion 16a of the vehicle body 16. The ring 25 consists of an elastic member 25a composed of a flange and guide; a washer 25a located at the back of the flange as pushed into the outer face of the guide in the elastic member 25, for maintaining the configuration of said flange; and a collar 25c pushed into the through hole in the guide of elastic member 25a, for maintaining the configuration of sid guide. The diameter $D_1$ of the hole in the elastic member 25a is made less than the outer diameter $D_2$ of the locking coil 18, so that a predetermined tension should be obtained between the member 25a and the coil 18. The inner face of the elastic member 25a can engage with the extension 23 of the locking coil 18, and the ring 25 fits with external thread 11.

The clearance adjustment of this embodiment is similar in operation to the first embodiment in FIG. 2. That is, while pressing the withdrawal lever 2 against the release bearing 3, the nut 17 is clamped until the washer 25b of the ring 25, which moves integrally with the flange 17a, contacts the flange portion 16a of the vehicle body 16. Thereafter the nut 17 is reversely rotated to impart the locking coil 18 a clamping power. Whereupon the nut 17 becomes unrotatable, and a predetermined amount of clearance between the nut 17 and the flange portion 16a of the vehicle body 16 is automatically obtained.

The use of the ring 25 as above-mentioned is convenient when a necessity of reversely rotating the nut 17 occurs during the adjustment. That is, because the extension 23 on the right end of the locking coil 18 as shown in FIG. 7 is engaged with the ring 25, rotation of the ring 25 enlarges the coiling diameter of the locking coil 18. Consequently the screw is released, and the nut can be easily reversed.

Figure 8:
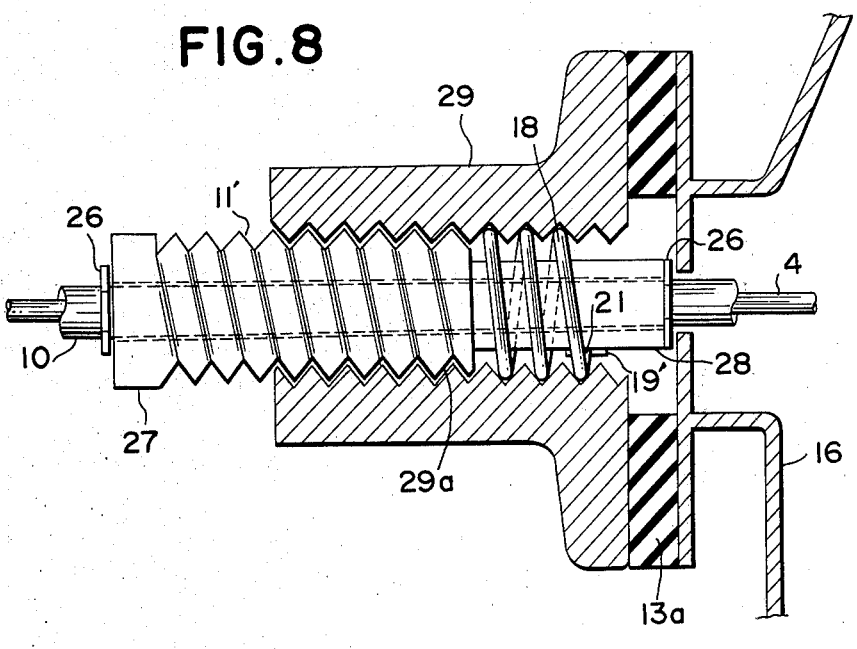

Still another embodiment of the invention will be explained, referring to FIG. 8. In this embodiment, the clearance-adjusting mechanism consists of a cap 29 fixed on the elastic member 13a, the internal thread 29a thereof being screwed with the locking coil 18, and a collar 27 having an external thread 11 which is screwed with said internal thread 29a. The collar 27 furthermore has a projection 19' formed on its smaller diametral portion 28. The projection 19' engages with the locking coil 18.

It is necessary to separate the outer cable 10 and collar 27 to avoid twisting of the cable 10 during the adjusting procedure. Also, in order to make them integrally mobile in the axial direction and to make the collar 27 freely rotatable in the direction of rotation with respect to the outer cable 10, such means as a snap ring 26 should be used.

The mechanism as above enables the automatic setting of an optimum clearance, when the collar 27 is rotatingly moved toward right as shown in the drawing, until the forward end of the collar 27 bears against the flange portion of vehicle body 16, while reducing the diameter of the locking coil 18, similarly to the foregoing embodiments, and then the collar 27 is reversed until it is locked by the opening of locking coil 18.

As has been explained, according to the present invention an optimum clearance can be easily obtained, using the first member having an external thread, locking coil screwed with said external thread, and a second member which is screwed with the first member and engaged with the locking coil, simply upon rotatingly moving the second member.

Although the present invention has been shown and described with reference to some preferred embodiments thereof, it should be understood that various alterations in the form and the content of any particular embodiment may be made without departing from the scope of the invention.

For example, the applicability of a clearance adjuster according to the present invention is not limited to a clutch control device, but it can be applied to all structures wherein a clearance between a certain member and another member must be maintained constant.

What is claimed is:

1. A clearance adjusting mechanism comprising:
   a first member having an external thread;
   a second member having an internal thread screwed with said external thread of said first member; and
   a locking coil for locking the relative movement between said first and second members only in case of a predetermined rotation direction thereof, said locking coil being screwed with the internal thread of said second member, said first member having a projection which one end of said locking coil may contact.

2. A clearance adjusting mechanism as defined in claim 1, wherein said first member has a larger diameter portion and a smaller diameter portion which are formed in a two-step configuration, said external thread being formed on said larger diameter portion, said locking coil being located along said smaller diameter portion on which said projection is positioned.

3. A clearance adjusting mechanism as defined in claim 1 or 6 wherein said first member holds a cable assembly one end of which is connected to a clutch pedal of a clutch system for an automotive vehicle and the other end of which is connected to a withdrawal lever thereof.

4. A clearance adjusting mechanism comprising:
- a cap having in its longitudinal direction an internal thread;
- a collar having an external thread screwed with said internal thread of said cap;
- a coil spring for locking the movement of said cap relative to said collar by having said coil spring engaged with said internal thread of said cap when the diameter of said coil spring is enlarged by rotating said cap with respect to said collar; and
- a projection formed on the outer surface of said collar, said projection being adapted to stop one end of said coil spring so that said coil spring is prevented from rotating after said projection contacts said one end of said coil spring.

5. A clearance adjusting mechanism of claim 4, wherein said projection is located near one end of said collar.

6. A clearance adjusting mechanism of claim 4, further comprising an elastic member provided between one end of said cap and a portion of a vehicle body.

7. A clearance adjusting mechanism of claim 4, wherein said collar has a larger diameter portion and a smaller diameter portion in a two-step form, said external thread being formed on said larger diameter portion, said coil spring being arranged along said smaller diameter portion between one end of said larger diameter portion and said projection.

8. A clearance adjusting mechanism of claim 4, wherein a cable assembly passes through a through-hole of said collar, one end of said cable assembly being connected to a clutch pedal of a clutch system for an automotive vehicle and the other end of said cable assembly being connected to a withdrawal lever of said clutch system.

9. A clearance adjusting mechanism of claim 4, wherein said cable assembly includes an outer cable which is separate from said collar to avoid twisting of the cable assembly.

* * * * *